US012722511B2

(12) United States Patent
Sato

(10) Patent No.: US 12,722,511 B2
(45) Date of Patent: Sep. 1, 2026

(54) CONTROL APPARATUS

(71) Applicant: SUBARU CORPORATION, Tokyo (JP)

(72) Inventor: Kazune Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 49 days.

(21) Appl. No.: 18/766,788

(22) Filed: Jul. 9, 2024

(65) Prior Publication Data

US 2024/0359580 A1 Oct. 31, 2024

Related U.S. Application Data

(63) Continuation of application No. PCT/JP2023/012257, filed on Mar. 27, 2023.

(51) Int. Cl.
*B60L 53/30* (2019.01)
*B60L 53/66* (2019.01)

(52) U.S. Cl.
CPC ............ *B60L 53/32* (2019.02); *B60L 53/665* (2019.02); *B60L 2240/62* (2013.01); *B60L 2240/645* (2013.01); *B60L 2240/68* (2013.01); *B60L 2240/72* (2013.01); *B60L 2250/00* (2013.01); *B60L 2260/50* (2013.01)

(58) Field of Classification Search
CPC .... B60L 53/32; B60L 53/665; B60L 2240/62; B60L 2240/645; B60L 2240/68; B60L 2240/72; B60L 2250/00; B60L 2260/50
USPC ........................................................ 701/22
See application file for complete search history.

(56) References Cited

U.S. PATENT DOCUMENTS

2017/0028854 A1* 2/2017 Lee ........................... H02J 7/00
2018/0037136 A1* 2/2018 Nelson ................... G01C 21/00
2021/0387535 A1* 12/2021 Makino ................... B60L 50/53
2022/0299337 A1* 9/2022 Joao ...................... B60W 20/12
2023/0226937 A1* 7/2023 Hanson .................. B60L 53/36
30/108

FOREIGN PATENT DOCUMENTS

JP 2019-158413 A 9/2019
JP 2023-3552 A 1/2023
WO WO-2021178385 A1 * 9/2021 ............ G06N 3/045

OTHER PUBLICATIONS

International Search Report dated May 23, 2023 from International Application No. PCT/JP2023/012257, 8 pages.

* cited by examiner

*Primary Examiner* — Kenneth M Dunne
*Assistant Examiner* — Brian K Palmarchuk
(74) *Attorney, Agent, or Firm* — Rimon P.C.

(57) ABSTRACT

A control apparatus includes one or more processors and one or more memories coupled to the one or more processors. The one or more processors are configured to determine whether to prohibit traveling of a vehicle on a wireless charging lane or a power reception of the vehicle from the wireless charging lane, based on: future action data; a fee to be generated when charging is performed by the wireless charging lane; and a fee to be generated when charging is performed by a charging facility adapted to perform the charging with the vehicle being stopped. The future action data is data on a future action estimated in consideration of an intention of a driver who drives the vehicle as an action to be performed in a future by the driver, and relates to an action of the driver to stop, in the future, at the charging facility.

20 Claims, 3 Drawing Sheets

[ FIG. 1 ]
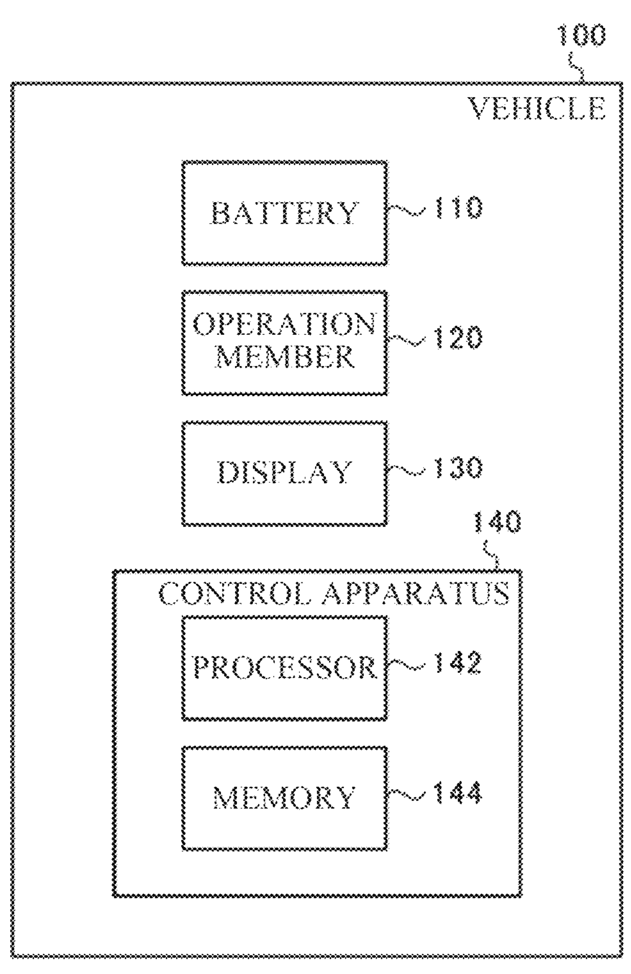
[ FIG. 2 ]
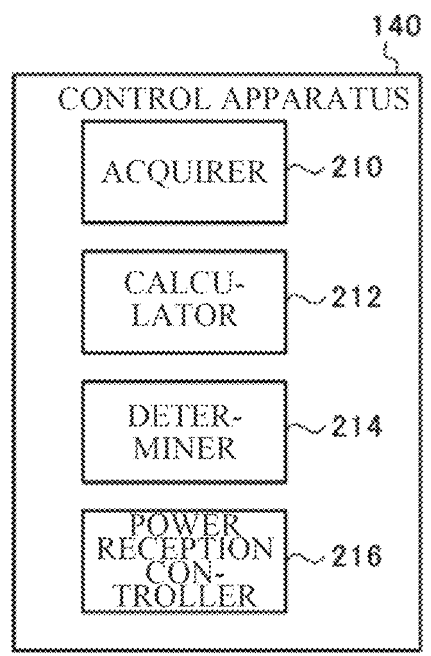

[ FIG. 3 ]

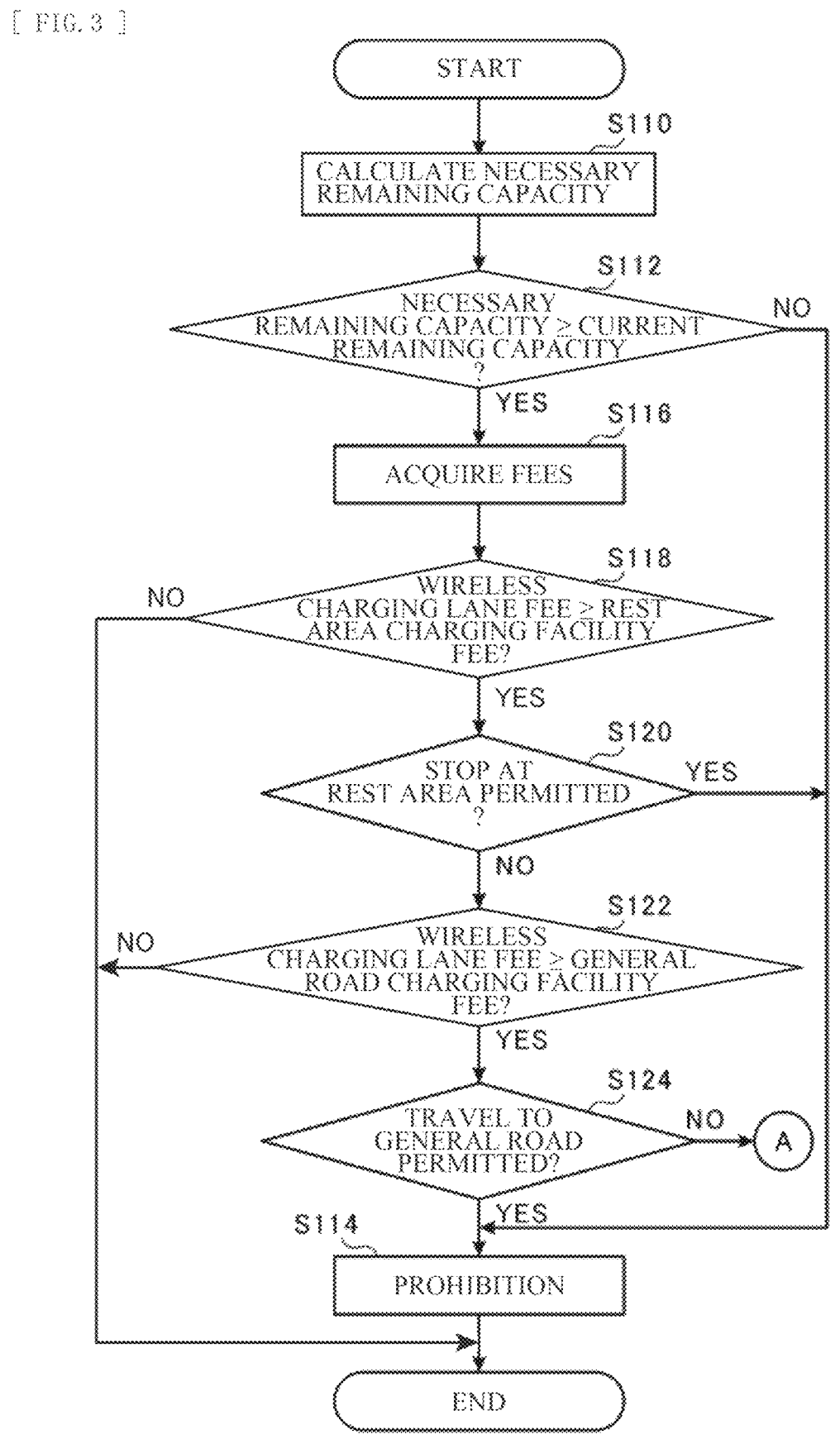

START

S110 CALCULATE NECESSARY REMAINING CAPACITY

S112 NECESSARY REMAINING CAPACITY ≥ CURRENT REMAINING CAPACITY ?

NO

YES

S116 ACQUIRE FEES

S118 WIRELESS CHARGING LANE FEE ≥ REST AREA CHARGING FACILITY FEE?

NO

YES

S120 STOP AT REST AREA PERMITTED ?

YES

NO

S122 WIRELESS CHARGING LANE FEE ≥ GENERAL ROAD CHARGING FACILITY FEE?

NO

YES

S124 TRAVEL TO GENERAL ROAD PERMITTED?

NO

A

YES

S114 PROHIBITION

END

Figure 4:
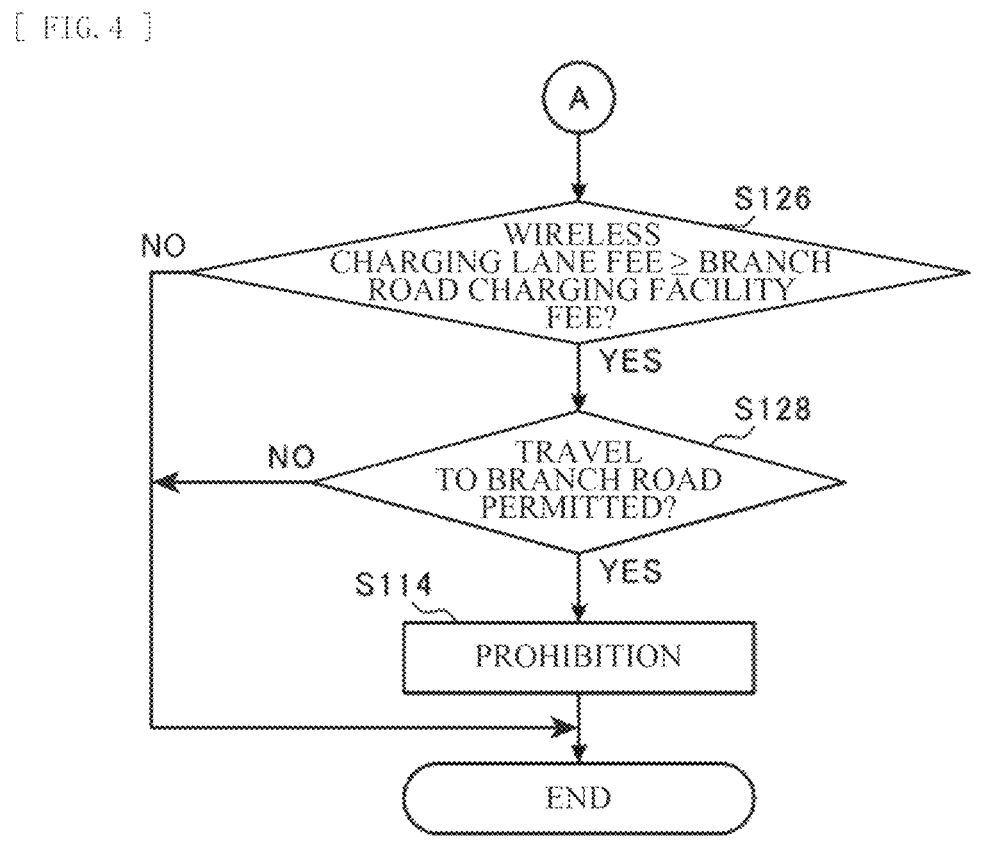

S126
WIRELESS CHARGING LANE FEE ≥ BRANCH ROAD CHARGING FACILITY FEE?
NO
YES

S128
TRAVEL TO BRANCH ROAD PERMITTED?
NO
YES

S114
PROHIBITION

END

CONTROL APPARATUS

CROSS-REFERENCE TO RELATED APPLICATIONS

This application is continuation of International Application No. PCT/JP2023/012257, filed on Mar. 27, 2023, the entire contents of which are hereby incorporated by reference.

BACKGROUND

The disclosure relates to a control apparatus that controls charging of a battery of a vehicle.

Electric vehicles and hybrid vehicles are becoming popular in order to reduce carbon dioxide emissions. Accordingly, to charge a battery of an electric vehicle or a hybrid vehicle, an installation of a charging facility in a parking lot of a facility such as a rest area on a freeway, a shopping center, a convenience store, or an accommodation facility, and an installation of a wireless charging lane on the freeway have been studied. For example, reference is made to Japanese Unexamined Patent Application Publication No. 2019-158413.

SUMMARY

An aspect of the disclosure provides a control apparatus to be applied to a vehicle. The control apparatus is configured to charge a battery of the vehicle. The control apparatus includes one or more processors, and one or more memories coupled to the one or more processors. The one or more processors are configured to determine whether to prohibit traveling of the vehicle on a wireless charging lane or a power reception of the vehicle from the wireless charging lane, based on: future action data, in which the future action data is data on a future action estimated in consideration of an intention of a driver who drives the vehicle as an action to be performed in a future by the driver, and relates to an action of the driver to stop, in the future, at a charging facility adapted to perform charging with the vehicle being stopped; a fee to be generated when charging is performed by the wireless charging lane; and a fee to be generated when the charging is performed by the charging facility.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 1 is a schematic diagram illustrating a configuration of a vehicle according to one example embodiment of the disclosure.

FIG. 2 is a block diagram illustrating an example of a configuration of a control apparatus for the vehicle illustrated in FIG. 1.

FIG. 3 is a flowchart illustrating a flow of processes of a charging method according to one example embodiment.

FIG. 4 is a flowchart illustrating a flow of processes of the charging method illustrated in FIG. 3.

DETAILED DESCRIPTION

A fee to be incurred upon charging by a wireless charging lane is different from a fee to be incurred upon charging by a charging facility. Accordingly, what is desired is a development of a technique adapted for charging at a low cost using the charging facility or the wireless charging lane.

It is desirable to provide a control apparatus that makes it possible to perform charging at a low cost.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

The following example embodiment describes an example where a wireless charging lane is provided on a freeway, although it is not limited thereto.

FIG. 1 is a schematic diagram illustrating a configuration of a vehicle 100 according to the example embodiment of the disclosure. Referring to FIG. 1, the vehicle 100 may include a battery 110, an operation member 120, a display 130, and a control apparatus 140.

The battery 110 may be a drive source of the vehicle 100. The vehicle 100 may be an electric vehicle or a hybrid vehicle.

The operation member 120 may receive an input of an operation performed by a driver who drives the vehicle 100. Non-limiting examples of the operation member 120 may include a touch panel. The display 130 may be any display such as a liquid crystal display or an organic electroluminescence (EL) display. For example, the operation member 120 and the display 130 may serve as a part of a car navigation system provided in the vehicle 100.

The control apparatus 140 includes one or more processors 142 and one or more memories 144 coupled to the one or more processors 142. Non-limiting examples of the processor 142 may include a central processing unit (CPU). Non-limiting examples of the memory 144 may include a read-only memory (ROM) and a random-access memory (RAM). The ROM may be a storage device that stores, for example, programs and operation parameters to be used by the CPU. The RAM may be a storage device that temporarily stores data such as variables or parameters to be used in a process to be executed by the CPU.

The control apparatus 140 may communicate with each device provided in the vehicle 100. Non-limiting examples of each device may include the battery 110, the operation member 120, and the display 130. A communication between the control apparatus 140 and each device may be based on, for example, a controller area network (CAN).

FIG. 2 is a block diagram illustrating an example of a configuration of the control apparatus 140 for the vehicle 100 according to the example embodiment of the disclosure. Referring to FIG. 2, the control apparatus 140 for the vehicle 100 may include, for example, an acquirer 210, a calculator 212, a determiner 214, and a power reception controller 216. In some embodiments, various kinds of processes including the following example processes to be performed by one or more of the acquirer 210, the calculator 212, the determiner 214, and the power reception controller 216 may be executed by the processor 142. For example, the processor 142 may execute a program stored in the memory 144 to execute various kinds of processes.

The acquirer 210 may acquire pieces of data including destination data, vehicle data, power consumption data, and future action data, based on the input of the operation performed by the driver using the operation member 120.

The destination data may indicate a traveling route to a destination of the vehicle 100.

The vehicle data may relate to a load of the vehicle 100. Non-limiting examples of the vehicle data may include data indicating the number of occupants of the vehicle 100, data indicating a loading amount, and data indicating a tow state. Non-limiting examples of the data indicating the tow state may include data indicating the presence or absence of tow and data indicating a weight of a towed object.

The power consumption data may indicate an amount of electric power consumed other than the driving of the vehicle 100. Non-limiting examples of the power consumption data may include data indicating electric power consumed in a vehicle compartment of the vehicle 100 and data indicating electric power consumed by an air conditioner.

Non-limiting examples of the future action data may include rest schedule data, general road schedule data, and branch road selection data. The rest schedule data may relate to an action to stop at a rest area having a charging facility. Non-limiting examples of the rest area may include a service area and a parking area. The general road schedule data may relate to an action to travel from the freeway to a general road. The branch road selection data may relate to an action to select a route of traveling at a branch point of the freeway. Non-limiting examples of the branch point of the freeway may include an interchange and a junction.

The acquirer 210 may establish a communication with an external server. The acquirer 210 may acquire environment data and road data from the external server.

Non-limiting examples of the environment data may include data indicating the weather, data indicating an outside air temperature, and data indicating the sunrise time and the sunset time. Non-limiting examples of the road data may include data indicating a congestion state, data indicating a construction state of a road, data indicating an accident state of the road, and data indicating a gradient of the road.

The acquirer 210 may extract a wireless charging lane provided within a reachable range in a traveling route. The reachable range may be a range reachable based on a current remaining capacity of the battery 110. The acquirer 210 may acquire, from the external server, data indicating a fee to be generated when charging is to be performed by the extracted wireless charging lane. Non-limiting examples of the data indicating the fee include data indicating a fee per unit capacity. The battery 110 may be charged when the vehicle 100 travels along the wireless charging lane.

The acquirer 210 may extract the charging facility provided within the reachable range in the traveling route. The acquirer 210 may acquire, from the external server, data indicating a fee to be generated when charging is performed by the extracted charging facility and data indicating a vacancy state. Non-limiting examples of the data indicating the fee may include data indicating a fee per unit capacity. The charging facility may be fixed to a parking lot. The charging facility may be adapted to perform the charging with the vehicle 100 being stopped. Non-limiting examples of the charging facility may include a charging facility provided at the rest area and a charging facility provided along the general road.

The calculator 212 may calculate a necessary remaining capacity, based on one or more of the destination data, the vehicle data, the power consumption data, the environment data, and the road data. The necessary remaining capacity may be a remaining capacity of the battery 110 necessary to reach the destination from a current location.

The determiner 214 may compare the current remaining capacity with the necessary remaining capacity. When the current remaining capacity is equal to or less than the necessary remaining capacity, the determiner 214 may determine that the battery 110 is to be charged. In this case, in some embodiments, the determiner 214 may determine whether to prohibit the traveling of the vehicle 100 on the wireless charging lane, based on the future action data of the driver who drives the vehicle 100.

The power reception controller 216 may permit or prohibit the traveling of the vehicle 100 on the wireless charging lane, based on a result of the determination made by the determiner 214.

[Charging Method]

Next, an example of a charging method of the vehicle 100 will be described. FIG. 3 is a flowchart illustrating a flow of processes of the charging method according to the example embodiment. FIG. 4 is a flowchart illustrating a flow of processes of the charging method illustrated in FIG. 3. Referring to FIGS. 3 and 4, the charging method according to the example embodiment may include a necessary remaining capacity calculation process S110, a comparison process S112, a prohibition process S114, a fee data acquisition process S116, a first fee determination process S118, a rest permission determination process S120, a second fee determination process S122, a general road permission determination process S124, a third fee determination process S126, and a branch road permission determination process S128. In the example embodiment, each process of the charging method may be executed when the vehicle 100 travels on the freeway, although it is not limited thereto. In the example embodiment, each process of the charging method may be repeatedly executed by an interruption generated at predetermined time intervals (for example, every 5 minutes), although it is not limited thereto. Hereinafter, each process will be described.

[Necessary Remaining Capacity Calculation Process S110]

The calculator 212 may calculate the necessary remaining capacity, based on one or more of the destination data, the vehicle data, the power consumption data, the environment data, and the road data. For example, the calculator 212 may calculate the necessary remaining capacity, based on the destination data. For example, the calculator 212 may correct the necessary remaining capacity, based on any of various kinds of data.

In one example, the calculator 212 may calculate the correction amount, based on the vehicle data. For example, the power consumption of the battery 110 increases when the load on the vehicle 100 is large. Accordingly, the calculator 212 may calculate, as the correction amount, the amount of power consumption that increases due to the load of the vehicle 100, based on the vehicle data. The calculator 212 may add the thus-obtained correction amount to the necessary remaining capacity.

In one example, the calculator 212 may calculate the correction amount, based on the power consumption data. For example, the calculator 212 may calculate, as the correction amount, the amount of power consumption indicated by the power consumption data. The calculator 212 may add the thus-obtained correction amount to the necessary remaining capacity.

In one example, the calculator 212 may calculate the correction amount, based on the environment data. For example, the calculator 212 may calculate the correction amount, based on the weather data as the environment data. For example, it is assumed that a wiper is to be operated in a case of rain or snow. Accordingly, the calculator 212 may calculate an amount of operation of the wiper as the correction amount, when the weather data indicates rain or snow. The calculator 212 may add the thus-obtained correction amount to the necessary remaining capacity.

In one example, the calculator 212 may calculate the correction amount, based on time data as the environment data. For example, it is assumed that a headlight is to be operated at night. Accordingly, the calculator 212 may calculate an amount of operation of the headlight as the correction amount, when the time data indicates nighttime. The calculator 212 may add the thus-obtained correction amount to the necessary remaining capacity.

In one example, the calculator 212 may calculate the correction amount, based on the road data. For example, the calculator 212 may calculate the correction amount, based on traffic congestion data as the road data. For example, it is assumed that the power consumption of the battery 110 increases upon traffic congestion. Accordingly, when the congestion data is acquired, the calculator 212 may calculate an increase in power consumption of the battery 110 as the correction amount. The calculator 212 may add the thus-obtained correction amount to the necessary remaining capacity.

In one example, the calculator 212 may calculate the correction amount, based on gradient data as the road data. For example, the power consumption of the battery 110 increases when traveling on an upward slope. Accordingly, when the road data is the gradient data indicating the upward slope, the calculator 212 may calculate an amount of the increase in power consumption of the battery 110 as the correction amount. The calculator 212 may add the thus-obtained correction amount to the necessary remaining capacity. For example, traveling on a downward slope allows for regeneration of the battery 110, making it possible to suppress a decrease in the remaining capacity of the battery 110 owing to the regenerative electric power. Accordingly, when the road data is the gradient data indicating the downward slope, the calculator 212 may calculate an amount of the regenerative electric power as the correction amount. The calculator 212 may subtract the thus-obtained correction amount from the necessary remaining capacity.

The calculator 212 may combine, in any combination, the calculation of the correction amount that is based on the vehicle data, the calculation of the correction amount that is based on the power consumption data, the calculation of the correction amount that is based on the environment data, and the calculation of the correction amount that is based on the road data.

[Comparison Process S112]

The determiner 214 may determine whether the current remaining capacity is equal to or less than the necessary remaining capacity. If it is determined that the current remaining capacity is not equal to or less than the necessary remaining capacity, that is, the current remaining capacity exceeds the necessary remaining capacity (NO in S112), the determiner 214 may shift the process to the prohibition process S114. If it is determined that the current remaining capacity is equal to or less than the necessary remaining capacity (YES in S112), the determiner 214 may shift the process to the fee data acquisition process S116.

[Prohibition Process S114]

The power reception controller 216 may prohibit the vehicle 100 from traveling on the wireless charging lane. The vehicle 100 may travel on a traveling lane other than the wireless charging lane.

[Fee Data Acquisition Process S116]

The acquirer 210 may extract the wireless charging lane provided within the reachable range. The acquirer 210 may acquire, from the external server, the data indicating the fee of the extracted wireless charging lane.

The acquirer 210 may extract one or more charging facilities provided within the reachable range. The acquirer 210 may acquire, from the external server, the data indicating the fee of the extracted charging facility and the data indicating the vacancy state.

[First Fee Determination Process S118]

The determiner 214 may determine whether the fee of the charging facility, out of the extracted charging facilities, that is provided at the rest area and allows for the charging when the vehicle 100 reaches the charging facility is equal to or less than the fee of the wireless charging lane. If the fee of the charging facility is not equal to or less than the fee of the wireless charging lane, that is, if the fee of the charging facility exceeds the fee of the wireless charging lane (NO in S118), the determiner 214 may end the charging process. If it is determined that the fee of the charging facility is equal to or less than the fee of the wireless charging lane (YES in S118), the process may proceed to the rest permission determination process S120.

[Rest Permission Determination Process S120]

The determiner 214 may control a device such as the display 130 or an unillustrated speaker to notify the driver of whether the driver intends to stop at the rest area. In some embodiments, the driver may input information indicating whether the driver intends to stop at the rest area using the operation member 120. If the acquirer 210 acquires, as the rest schedule data, the information indicating that the driver intends to stop at the rest area (YES in S120), the determiner 214 may shift the process to the prohibition process S114. The control apparatus 140 may make a reservation of the charging facility provided at the rest area. If the acquirer 210 acquires the information indicating that the driver does not intend to stop at the rest area (NO in S120), the determiner 214 may shift the process to the second fee determination process S122.

[Second Fee Determination Process S122]

The determiner 214 may determine whether the fee of the charging facility, out of the extracted charging facilities, that is provided along the general road and allows for the charging when the vehicle 100 reaches the charging facility is equal to or less than the fee of the wireless charging lane. If the fee of the charging facility is not equal to or less than the fee of the wireless charging lane, that is, if the fee of the charging facility exceeds the fee of the wireless charging lane (NO in S122), the determiner 214 may end the charging process. If it is determined that the fee of the charging facility is equal to or less than the fee of the wireless charging lane (YES in S122), the process may proceed to the general road permission determination process S124.

[General Road Permission Determination Process S124]

The determiner 214 may control a device such as the display 130 or the unillustrated speaker to notify the driver of whether the driver intends to travel from the freeway to the general road. In some embodiments, the driver may input information indicating whether the driver intends to travel from the freeway to the general road using the operation member 120. If the acquirer 210 acquires, as the general road schedule data, the information indicating that the driver intends to travel from the freeway to the general road (YES in S124), the determiner 214 may shift the process to the prohibition process S114. The control apparatus 140 may make a reservation of the charging facility provided along the general road. If the acquirer 210 acquires the information indicating that the driver does not intend to travel from the freeway to the general road (NO in S124), the determiner 214 may shift the process to the third fee determination process S126.

[Third Fee Determination Process S126]

The determiner 214 may determine whether the fee of the charging facility, out of the extracted charging facilities, that is provided along any of multiple branch roads branched from the branch point of the freeway and allows for the charging when the vehicle 100 reaches the charging facility is equal to or less than the fee of the wireless charging lane. If the fee of the charging facility is not equal to or less than the fee of the wireless charging lane, that is, if the fee of the charging facility exceeds the fee of the wireless charging lane (NO in S126), the determiner 214 may end the charging process. If it is determined that the fee of the charging facility is equal to or less than the fee of the wireless charging lane (YES in S126), the process may proceed to the branch road permission determination process S128.

[Branch Road Permission Determination Process S128]

The determiner 214 may control a device such as the display 130 or the unillustrated speaker to notify the driver of whether the driver intends to proceed to the branch road provided with the charging facility out of the branch roads branched from the branch point of the freeway. In some embodiments, the driver may input information indicating whether the driver intends to proceed from the freeway to the branch road using the operation member 120. If the acquirer 210 acquires, as the branch road selection data, the information indicating that the driver intends to proceed from the freeway to the branch road (YES in S128), the determiner 214 may shift the process to the prohibition process S114. The control apparatus 140 may make a reservation of the charging facility provided along the branch road. If the acquirer 210 acquires the information indicating that the driver does not intend to proceed from the freeway to the branch road (NO in S128), the determiner 214 may end the charging process.

The control apparatus 140 according to the example embodiment determines whether to prohibit the traveling of the vehicle 100 on the wireless charging lane, based on the future action data of the driver who drives the vehicle 100. Thus, the control apparatus 140 helps to appropriately prohibit the traveling of the vehicle 100 on the wireless charging lane in accordance with a future action to be taken by the driver. For example, this configuration helps to suppress unnecessary traveling of the vehicle 100 on the wireless charging lane when the fee of the wireless charging lane is higher than the fee of the charging facility that the vehicle 100 is to visit in the future. Accordingly, the control apparatus 140 helps to allow the vehicle 100 to reach the destination while performing the charging at a low cost.

The battery 110 is more likely to deteriorate when charged by the wireless charging lane than when charged by the charging facility. Accordingly, the control apparatus 140 helps to suppress the deterioration of the battery 110 by appropriately prohibiting the vehicle 100 from traveling on the wireless charging lane in accordance with the future action to be taken by the driver.

First Modification Example

In the example embodiment described above, the acquirer 210 may acquire the future action data, based on the input of the operation performed by the driver. In some embodiments, the acquirer 210 may acquire the future action data, based on the traveling route of the vehicle 100.

For example, in the rest permission determination process S120, the acquirer 210 may determine whether the rest area having the charging facility exists within the reachable range along the traveling route. If it is determined that the rest area having the charging facility exists (YES in S120), the acquirer 210 may estimate that the vehicle 100 is to stop at the rest area, and acquire the rest schedule data indicating that the vehicle 100 is to stop at the rest area. The control apparatus 140 may make a reservation of the charging facility provided at the rest area. If it is determined that there is no rest area having the charge facility (NO in S120), the determiner 214 may shift the process to the second fee determination process S122.

In the general road permission determination process S124, the acquirer 210 may determine whether the general road exists within the reachable range along the traveling route. If it is determined that the general road exists (YES in S124), the acquirer 210 may estimate that the vehicle 100 is to travel from the freeway to the general road, and acquire the general road schedule data indicating that the vehicle 100 is to travel from the freeway to the general road. The control apparatus 140 may make a reservation of the charging facility provided along the general road. If the acquirer 210 determines that there is no such a general road (NO in S124), the determiner 214 may shift the process to the third fee determination process S126.

In the branch road permission determination process S128, the acquirer 210 may determine, out of the branch roads branched from the branch point of the freeway, whether the branch road having the charging facility exists within the reachable range along the traveling route. If it is determined that the branch road exists (YES in S128), the acquirer 210 may estimate that the vehicle 100 is to travel from the freeway to the branch road, and acquire the branch road selection data indicating that the vehicle 100 is to travel from the freeway to the branch road. The control apparatus 140 may make a reservation of the charging facility provided along the branch road. If the acquirer 210 determines that there is no such a branch road (NO in S128), the determiner 214 may end the charging process.

Second Modification Example

In some embodiments, the acquirer 210 may acquire the future action data, based on the congestion data.

For example, in the rest permission determination process S120, the acquirer 210 may refer to the traffic congestion data and determine whether a traffic congestion has occurred on the freeway along which the vehicle 100 currently travels. If it is determined that the traffic congestion has occurred (YES in S120), the acquirer 210 may estimate that the vehicle 100 is to stop at the rest area, and acquire the rest schedule data indicating that the vehicle 100 is to stop at the rest area. The control apparatus 140 may make a reservation of the charging facility provided at the rest area. If it is determined that no congestion has occurred (NO in S120), the determiner 214 may shift the process to the second fee determination process S122.

In the general road permission determination process S124, the acquirer 210 may refer to the traffic congestion data to determine whether the traffic congestion has occurred on the freeway along which the vehicle 100 currently travels. If it is determined that the traffic congestion has occurred (YES in S124), the acquirer 210 may estimate that the vehicle 100 is to travel from the freeway to the general road, and acquire the general road schedule data indicating that the vehicle 100 is to travel from the freeway to the general road. The control apparatus 140 may make a reservation of the charging facility provided along the general road. If the acquirer 210 determines that no congestion has occurred (NO in S124), the determiner 214 may shift the process to the third fee determination process S126.

In the branch road permission determination process S128, the acquirer 210 may refer to the traffic congestion data and determine whether the traffic congestion has occurred on the freeway along which the vehicle 100 currently travels. If it is determined that the traffic congestion has occurred (YES in S128), the acquirer 210 may estimate that the vehicle 100 is to travel from the branch point of the freeway to the branch road along which the charging facility is provided, and acquire the branch road selection data indicating that the vehicle 100 is to travel from the branch point of the freeway to the branch road provided with the charging facility. The control apparatus 140 may make a reservation of the charging facility provided along the branch road. If the acquirer 210 determines that no congestion has occurred (NO in S128), the determiner 214 may end the charging process.

Third Modification Example

In some embodiments, the acquirer 210 may acquire the future action data, based on data on a state of the driver who drives the vehicle 100. Non-limiting example of the state data of the driver may include data on a degree of fatigue and a degree of hunger of the driver.

For example, in the rest permission determination process S120, the acquirer 210 may acquire the status data of the driver from a smart device such as a smart watch of the driver, and determine whether the degree of fatigue of the driver is equal to or greater than a predetermined value. If it is determined that the degree of fatigue of the driver is equal to or greater than the predetermined value (YES in S120), the acquirer 210 may estimate that the vehicle 100 is to stop at the rest area, and acquire the rest schedule data indicating that the vehicle 100 is to stop at the rest area. The control apparatus 140 may make a reservation of the charging facility provided at the rest area. If it is determined that the degree of fatigue of the driver is not equal to or greater than the predetermined value (NO in S120), the determiner 214 may shift the process to the second fee determination process S122.

In the general road permission determination process S124, the acquirer 210 may acquire the status data of the driver from the smart device such as the smart watch of the driver, and determine whether the degree of fatigue of the driver is equal to or greater than a predetermined value. If it is determined that the degree of fatigue of the driver is equal to or greater than the predetermined value (YES in S124), the acquirer 210 may estimate that the vehicle 100 is to travel from the freeway to the general road, and acquire the general road schedule data indicating that the vehicle 100 is to travel from the freeway to the general road. The control apparatus 140 may make a reservation of the charging facility provided along the general road. If the acquirer 210 determine that the degree of fatigue of the driver is not equal to or greater than the predetermined value (NO in S124), the determiner 214 may shift the process to the third fee determination process S126.

In the branch road permission determination process S128, the acquirer 210 may acquire the status data of the driver from the smart device such as the smart watch of the driver, and determine whether the degree of fatigue of the driver is equal to or greater than a predetermined value. If it is determined that the degree of fatigue of the driver is equal to or greater than the predetermined value (YES in S128), the acquirer 210 may estimate that the vehicle 100 is to travel from the branch point of the freeway to the branch road along which the charging facility is provided, and acquire the branch road selection data indicating that the vehicle 100 is to travel from the branch point of the freeway to the branch road provided with the charging facility. The control apparatus 140 may make a reservation of the charging facility provided along the branch road. If the acquirer 210 determine that the degree of fatigue of the driver is not equal to or greater than the predetermined value (NO in S128), the determiner 214 may end the charging process.

Although some example embodiments of the disclosure have been described in the foregoing by way of example with reference to the accompanying drawings, the disclosure is by no means limited to the example embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, in the example embodiment, the power reception controller 216 may permit or prohibit the traveling of the vehicle 100 on the wireless charging lane, based on a result of the determination made by the determiner 214. In some cases, it may be possible to prohibit a power reception from the wireless charging lane when the vehicle 100 travels on the wireless charging lane. In some embodiments, the power reception controller 216 may permit or prohibit the power reception from the wireless charging lane, instead of permitting or prohibiting the traveling of the vehicle 100 on the wireless charging lane.

In the example embodiment, the determiner 214 may compare the fee of the wireless charging lane and the fee of the charging facility with each other. In some embodiments, the determiner 214 may compare a degree of deterioration of the battery 110 where the battery is charged by the wireless charging lane and a degree of deterioration of the battery 110 where the battery is charged by the charging facility with each other. In this case, the charging that involves a low degradation degree may be prioritized.

In the example embodiment, an example is given where the wireless charging lane is provided on the freeway. However, the wireless charging lane may be provided on the general road. In some embodiments, the control apparatus 140 may prohibit the vehicle 100 from traveling on the wireless charging lane or receiving the electric power from the wireless charging lane when the vehicle 100 is to make a stop at the charging facility that involves a lower cost than the wireless charging lane, based on the future action data.

The processor 142 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 142. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 142 illustrated in FIG. 1.

The invention claimed is:

1. A control apparatus for a vehicle, the control apparatus being configured to control charging of a battery of the vehicle, the control apparatus comprising:
- one or more processors; and
- one or more memories coupled to the one or more processors, wherein
- the one or more processors are configured to:
  - calculate a necessary remaining capacity of the battery necessary for the vehicle to reach a destination from a current location;
  - compare a current remaining capacity of the battery with the necessary remaining capacity;
  - in response to determining that the current remaining capacity does not exceed the necessary remaining capacity, acquire a fee of a wireless charging lane provided within a reachable range in a traveling route of the vehicle, and a fee of a charging facility provided within the reachable range in the traveling route;
  - determine whether charging is available at the charging facility when the vehicle reaches the charging facility;
  - in response to determining that charging is available at the charging facility when the vehicle reaches the charging facility, compare the fee of the wireless charging lane with the fee of the charging facility;
  - in response to determining that the fee of the charging facility is less than or equal to the fee of the wireless charging lane, determine a subsequent route or stop of the vehicle; and
  - based on the determined subsequent route or stop of the vehicle, prohibit the vehicle from at least one of: (i) traveling on a wireless charging lane, or (ii) receiving power from the wireless charging lane.

2. The control apparatus according to claim 1, wherein the determined subsequent route or stop of the vehicle comprises stopping at a rest area having the charging facility.

3. The control apparatus according to claim 1, wherein the determined subsequent route or stop of the vehicle comprises traveling from a freeway to a general road having the charging facility.

4. The control apparatus according to claim 1, wherein the determined subsequent route or stop of the vehicle comprises selecting a route of traveling at a branch point of a freeway toward a branch road having the charging facility.

5. The control apparatus according to claim 1, wherein the one or more processors are configured to determine the subsequent route or stop of the vehicle, based on a traveling route of the vehicle.

6. The control apparatus according to claim 2, wherein the one or more processors are configured to determine the subsequent route or stop of the vehicle, based on a traveling route of the vehicle.

7. The control apparatus according to claim 3, wherein the one or more processors are configured to determine the subsequent route or stop of the vehicle, based on a traveling route of the vehicle.

8. The control apparatus according to claim 4, wherein the one or more processors are configured to determine the subsequent route or stop of the vehicle, based on a traveling route of the vehicle.

9. The control apparatus according to claim 1, wherein the one or more processors are configured to determine the subsequent route or stop of the vehicle, based on congestion data.

10. The control apparatus according to claim 2, wherein the one or more processors are configured to determine the subsequent route or stop of the vehicle, based on congestion data.

11. The control apparatus according to claim 3, wherein the one or more processors are configured to determine the subsequent route or stop of the vehicle, based on congestion data.

12. The control apparatus according to claim 4, wherein the one or more processors are configured to determine the subsequent route or stop of the vehicle, based on congestion data.

13. The control apparatus according to claim 1, wherein the one or more processors are configured to determine the subsequent route or stop of the vehicle, based on an input of an operation to be performed by a driver of the vehicle.

14. The control apparatus according to claim 2, wherein the one or more processors are configured to determine the subsequent route or stop of the vehicle, based on an input of an operation to be performed by a driver of the vehicle.

15. The control apparatus according to claim 3, wherein the one or more processors are configured to determine the subsequent route or stop of the vehicle, based on an input of an operation to be performed by a driver of the vehicle.

16. The control apparatus according to claim 4, wherein the one or more processors are configured to determine the subsequent route or stop of the vehicle, based on an input of an operation to be performed by a driver of the vehicle.

17. The control apparatus according to claim 1, wherein the one or more processors are configured to determine the subsequent route or stop of the vehicle, based on data on a state of a driver of the vehicle.

18. The control apparatus according to claim 2, wherein the one or more processors are configured to determine the subsequent route or stop of the vehicle, based on data on a state of a driver of the vehicle.

19. The control apparatus according to claim 3, wherein the one or more processors are configured to determine the subsequent route or stop of the vehicle, based on data on a state of a driver of the vehicle.

20. The control apparatus according to claim 1, wherein the one or more processors are configured to, in response to determining that the fee of the charging facility is equal to or less than the fee of the wireless charging lane, make a reservation of the charging facility.

* * * * *